(12) United States Patent
Futenma et al.

(10) Patent No.: US 7,564,782 B2
(45) Date of Patent: Jul. 21, 2009

(54) TRANSMISSION FORMAT, COMMUNICATION CONTROL APPARATUS AND METHOD, RECORDING MEDIUM, AND PROGRAM

(75) Inventors: Satoshi Futenma, Tokyo (JP); Takahiro Fukuhara, Kanagawa (JP); Eisaburo Itakura, Kanagawa (JP); Seiji Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 10/289,056

(22) Filed: Nov. 6, 2002

(65) Prior Publication Data
US 2003/0091054 A1    May 15, 2003

(30) Foreign Application Priority Data
Nov. 8, 2001 (JP) ............................ P2001-342685
Jun. 27, 2002 (JP) ............................ P2002-187105

(51) Int. Cl.
*H04L 12/26* (2006.01)
*H04B 1/66* (2006.01)
*G06F 15/173* (2006.01)

(52) U.S. Cl. ................. 370/230; 370/231; 370/232; 370/233; 370/234; 370/235; 370/289; 370/395.42; 370/466; 370/469; 370/476; 375/240; 375/322; 709/203; 709/226; 709/231

(58) Field of Classification Search ......... 709/203–235; 370/229–235, 389–477, 356; 375/240–245
See application file for complete search history.

(56) References Cited

U.S. PATENT DOCUMENTS

| | | | |
|---|---|---|---|
| 6,185,737 B1 * | 2/2001 | Northcutt et al. ............ 725/110 |
| 6,377,995 B2 * | 4/2002 | Agraharam et al. ......... 709/231 |
| 6,480,537 B1 * | 11/2002 | Agrawal et al. ............. 375/240 |
| 6,628,629 B1 * | 9/2003 | Jorgensen .................... 370/322 |
| 6,963,561 B1 * | 11/2005 | Lahat ........................... 370/356 |
| 6,981,045 B1 * | 12/2005 | Brooks ........................ 709/226 |
| 6,987,730 B2 * | 1/2006 | Hata et al. ................... 370/232 |

(Continued)

FOREIGN PATENT DOCUMENTS

JP             63-073789          9/1986

(Continued)

OTHER PUBLICATIONS

Kikuchi et al., "RFC-3016, RTP Payload Format for MPEG-4 Audio/Visual Streams", Nov. 2000.☐☐<http://www.rfc-editor.org/rfc/rfc3016.txt>.*

(Continued)

*Primary Examiner*—Ayaz R Sheikh
*Assistant Examiner*—Venkatesh Haliyur
(74) *Attorney, Agent, or Firm*—K&L Gates LLP (57) ABSTRACT

JPEG-2000 data is formatted into RTP packets for transmission through the Internet. A priority field is provided in the format, and a value indicating the importance of a code stream included in a packet is stored therein. A type field indicates a payload type of a JPEG-2000 code stream. An mh_id field is provided as an identifier of a main header of the JPEG-2000 code stream and indicates a change in the main header. An mh_length field indicates the length of the main header and a fragment offset field stores the number of offset bytes from the start of an image of the packet.

9 Claims, 7 Drawing Sheets

U.S. PATENT DOCUMENTS

| | | | |
|---|---|---|---|
| 7,114,174 B1 * | 9/2006 | Brooks et al. | 725/105 |
| 7,143,432 B1 * | 11/2006 | Brooks et al. | 725/105 |
| 7,145,919 B2 * | 12/2006 | Krishnarajah et al. | 370/474 |
| 7,206,804 B1 * | 4/2007 | Deshpande et al. | 709/203 |
| 7,339,993 B1 * | 3/2008 | Brooks et al. | 375/240.26 |
| 7,385,921 B2 * | 6/2008 | Itakura et al. | 370/230 |
| 2002/0071485 A1 * | 6/2002 | Caglar et al. | 375/240.01 |
| 2003/0009589 A1 * | 1/2003 | Apostolopoulos et al. | 709/239 |
| 2003/0118107 A1 * | 6/2003 | Itakura et al. | 375/240.19 |
| 2005/0210145 A1 * | 9/2005 | Kim et al. | 709/231 |
| 2006/0064716 A1 * | 3/2006 | Sull et al. | 725/37 |
| 2006/0146934 A1 * | 7/2006 | Caglar et al. | 375/240.12 |
| 2007/0206592 A1 * | 9/2007 | Itakura et al. | 370/389 |

FOREIGN PATENT DOCUMENTS

| | | |
|---|---|---|
| JP | 03-022780 | 6/1989 |
| JP | 06-303436 | 10/1994 |
| JP | 11-225168 | 8/1999 |
| JP | 2001-45098 | 2/2001 |
| JP | 2001-274861 | 10/2001 |

OTHER PUBLICATIONS

Triceps Company, Video Coding Technology in Internet/Mobile Communications, pp. 35-41, Aug. 30, 2000.

Search report associated with corresponding Japanese patent application, No. 2002-187105 issued on Jul. 11, 2006.

Japanese Office Action dated Apr. 14, 2009, for corresponding JP Patent Application 2007-129193.

* cited by examiner

FIG. 1

| 8 BITS | 8 BITS | 4 BITS | 12 BITS |
|--------|--------|--------|---------|
| type | priority | mh_id | mh_length |
| fragment offset ||||

```
/*STRUCTURE FOR SAVING*/
struct {
        u_int16_t mh_id;        /*mh_id*/
        u_int16_t mh_length;    /*mh_length*/
        u_int16_t seq;          /*RTP SEQUENCE NUMBER*/
        u_int32_t rtp_ts;       /*RTP TIME STAMP*/
        unsigned char* MH;        /*SAVED Main Header*/
}saved_mh;
```

FIG. 7

```
/*SAVING ALGORITHM*/
if(fragment offset FIELD OF THE RECEIVED HEAD PACKET
OF EACH FRAME IS 0 && DATA OF RECEIVED FRAME IS
LONGER THAN mh_length){
  saved_mh.mh_id        =mh_id;
  saved_mh.mh_length    =mh_length;
  saved_mh.seq          =rtp_seq;
  saved_mh.rtp_ts       =rtp_timestamp;
  if(saved_mh_length > 0  && saved_mh.MH!=NULL) free(saved_mh_MH);
  saved_mh.MH           =(unsigned char*)malloc(mh_length);
  memcpy (saved_mh_MH, &JP2K, mh_length)
```

FIG. 8

```
if(VALUE OF fragment offset FIELD OF THE RECEIVED HEAD
   PACKET OF EACH FRAME IS NOT 0 || DATA OF
   RECEIVED FRAME IS SHORTER THAN mh_length){
   /* DETERMINE THAT Main Header IS LOST WHEN HEAD
      PACKET OF DATA OF FRAME IS NOT ARRIVED OR WHEN
      PACKET OF LATTER PART OF Main Header IS NOT ARRIVED*/
   /* COMPARE SAVED Main Header WITH Main Header
      OF THE FRAME
         (1) FIRST, CHECK WHETHER BOTH mh_id MATCH, AND
         (2) NEXT, CHECK WHETHER SEQUENCE NUMBER OF
             THE SAVED Main Header IS TOO OLD (IF THE NUMBER
             IS TOO OLD, mh_id MAY HAVE MADE A ROUND,
             AND COMPLEMENT IS NOT PERFORMED)
      */
   if (cur_frame_mh_id==saved_mh.mh_id &&
       cur_frame_seq < saved_mh.seq + MAX_GAP_SEQUENCE)
          /* COPY SAVED Main Header TO HEAD OF FRAME*/
          memcpy(&JP2K,saved_mh.MH,mh_length);
   }
}
```

FIG. 9

TRANSMISSION FORMAT, COMMUNICATION CONTROL APPARATUS AND METHOD, RECORDING MEDIUM, AND PROGRAM

BACKGROUND OF THE INVENTION

The present invention relates to a transmission format, a communication control apparatus and method, a recording medium, and a program. More specifically, the present invention relates to a transmission format in which JPEG-2000 data can be transmitted through the Internet, a communication control apparatus and method, a recording medium, and a program.

When streaming is performed on the Internet, problems, such as deterioration of data due to packet loss or delay of arrival, may be caused. In an encoding method using interframe differential, such as moving picture experts group (MPEG) format and H.26x system, when data of a frame is lost due to a packet loss, the error is propagated. That is, the image quality of the subsequent frames is badly affected. Also, in the MPEG method, a compression rate is increased by motion prediction. However, by performing motion prediction, an algorithm becomes complicated and the processing time increases in proportion with the square of the frame size. Accordingly, a several-frame encoding delay occurs in principle. When interactive real-time communication is performed, this delay is barely within the tolerable delay time of 250 ms, which cannot be ignored.

On the other hand, in Motion JPEG 2000, static image compression algorithm JPEG2000, which is the successor of joint photographic expert group (JPEG) is continuously played back so as to generate a motion picture. The file format of the Motion JPEG 2000 is defined in part 3 of the JPEG-2000 standard which is standardized by ISO. Since the Motion JPEG 2000 is a motion picture format which does not use interframe differential, the above-described problems do not occur. Also, in the JPEG 2000 which is the basic of the Motion JPEG 2000, the compression rate is increased by a wavelet transform and entropy encoding. Thus, in the JPEG 2000, higher compression and higher definition can be achieved compared to the Motion JPEG and a DV, which are the same as the JPEG 2000 in that they are motion picture formats which do not use interframe differential. Also, the JPEG 2000 has an error tolerance. Accordingly, a motion picture format such as the Motion JPEG 2000, which does not use interframe differential, is suitable for the environment where packet loss occurs, such as the Internet.

However, the transmission format for performing streaming using JPEG 2000 does not exist. The Motion JPEG 2000 defined in part 3 of JPEG 2000 includes only a saving method, that is, a file format. In many cases, a realtime transport protocol (RTP) is used to transfer real-time media over the Internet. However, even the IETF, which is considered a format for transferring various media with the RTP, does not define the RTP format for JPEG 2000.

SUMMARY OF THE INVENTION

The present invention has been made in view of the above-described state, and it is an object of the present invention to realize transmission of JPEG-2000 data through the Internet.

A transmission format of the present invention comprises a priority field indicating the importance of data included in the packet. The transmission format is used for transmitting JPEG-2000 data by RTP.

The transmission format may include information required for complementing a main header of the JPEG-2000 data. The information required for complementing the main header may be a main header identifier. The information required for complementing the main header may be the length of the main header.

The transmission format may further comprise a field for indicating an offset from the start when the JPEG-2000 data is divided into a plurality of packets. The JPEG-2000 data may be divided in consideration of packet loss.

The division of the JPEG-2000 data in consideration of packet loss means that the JPEG-2000 data is divided into significant data units so as to configure the RTP packet with only complete data units, or the RTP packet is configured only with incomplete data units. The significant data unit may be the main header, tile-part header, entire data, or individual JP2 packet of JPEG-2000 standard.

The transmission format may further comprise a packet type field indicating which data unit is packetized when packet formation is performed in data units.

A communication control apparatus of the present invention comprises a selecting unit for deciding whether or not a main header should be transmitted when the main header added to the packet does not change. The communication control apparatus may further comprise an adding unit for adding a compressed main header instead of the main header to the packet when the selecting unit decides not to transmit the main header. The adding unit may add only a changed part as the compressed main header when the main header slightly changes.

A communication control method of the present invention comprises a step of deciding whether or not a main header should be transmitted when the main header added to the packet does not change.

A program recorded in a recording medium of the present invention comprises a step of deciding whether or not a main header should be transmitted when the main header added to the packet does not change.

A program of the present invention allows a computer to execute a step of deciding whether or not a main header should be transmitted when the main header added to the packet does not change.

The transmission format of the present invention comprises a priority field indicating the importance of data included in the packet.

In the communication control apparatus and method, the recording medium, and the program of the present invention, whether or not the main header should be transmitted is decided when the main header added to the packet does not change.

Additional features and advantages of the present invention are described in, and will be apparent from, the following Detailed Description of the Invention and the figures.

DETAILED DESCRIPTION OF THE INVENTION

The present invention provides a processing method for payload information which is required for transmitting a JPEG-2000 video stream with RTP packets. First, the following points should be considered in order to transmit a JPEG-2000 video stream through the Internet. Packet loss naturally occurs on the Internet, and thus packet loss has to be considered. Specifically, a packetization, in which a JPEG-2000 image is divided into RTP packets, is designed so that the entire frame of the JPEG-2000 image is not affected or less affected even if some packets are lost.

Likewise, measures must be taken against loss of information of a JPEG-2000 main header. Compression parameters (information including number of decomposition level by wavelet transform, number of color components, number of layers, and quantization table) are written on the JPEG-2000 main header. Inadequate reception of the main header affects decode processing, and decoding cannot be conducted at all in the worst case.

Retransmission processing performed in TCP may be adopted to counter packet loss. However, when a JPEG-2000 video stream is used in a real-time operating application, retransmission may be delayed. Thus, a transmission method in which retransmission is not taken into account should be used.

In JPEG 2000, image data is hierarchically encoded, and a scalable communication in accordance with the ability of a receiving terminal and a network bandwidth can be performed. When a JPEG-2000 video stream is RTP-packetized, the hierarchical information is embedded.

Figure 1:
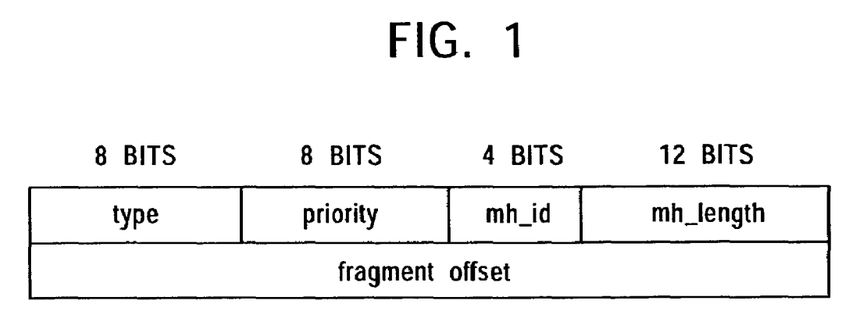
FIG. 1 shows a payload format.

When the JPEG-2000 video stream is packetized, a payload header as shown in FIG. 1 is attached to each packet. The payload header includes an 8-bit type field, an 8-bit priority field, a 4-bit mh_id field, a 12-bit mh_length field, and a 32-bit fragment offset field. Hereinafter, each of the fields will be described.

The type field indicates the payload type of a JPEG-2000 code stream transferred by packets. JPEG 2000 is formed by a plurality of data units such as a main header and a tile-part header. Thus, the JPEG-2000 video stream is packetized so that the data units included in the packets can be easily recognized. The data units will be described later.

A value indicating the importance of a code stream included in the packet is written on the priority field. Since image data is hierarchically encoded in JPEG 2000, lower data of wavelet is more important than higher data. Further, in hierarchical encoding of JPEG 2000, various hierarchies exist: resolutional hierarchy according to a wavelet level, image hierarchy according to a quantization level, tone hierarchy according to the number of colors, and so on. Accordingly, the method for deciding importance is different in each application.

Figure 2:
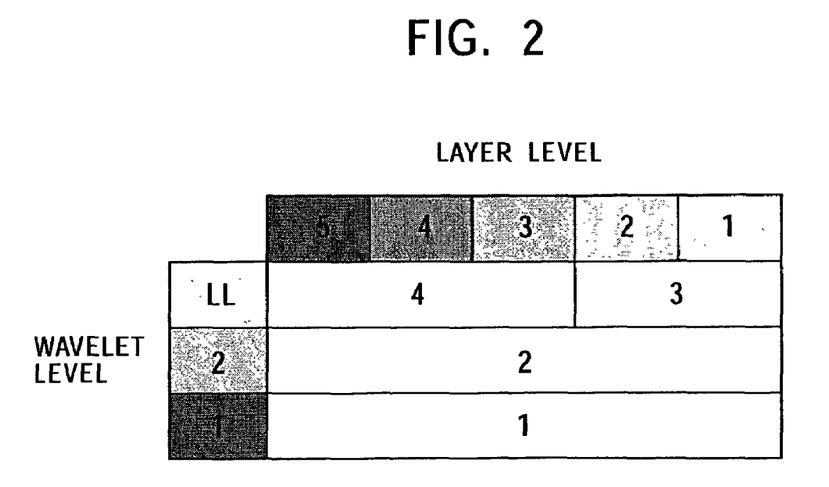
FIG. 2 shows a priority mapping table.

A table indicating the correspondence between hierarchical information and the importance is dynamically formed, and is transferred by using a control channel which is different from a channel for video communication, at the beginning of communication or during communication. A transmitter sets a value corresponding to the hierarchical information to the priority field in accordance with the predetermined correspondence table. FIG. 2 shows an example of a table indicating the correspondence between the hierarchical information and the importance in a case of a 3-layer wavelet and a 5-layer quantization level.

The mh_id field is an identifier of the main header of a JPEG-2000 code stream, and is used for determining whether or not the main header is changed. The value of mh_id itself is not significant, and is used for determining whether or not the encoding parameters written on the main header of the previous image frame are identical to those of the image frame to which the packet belongs.

The mh_length field indicates the length of the main header of the JPEG-2000 code stream. In the fragment offset field, the number of offset bytes from the start of the image in the packet is set. Even when the RTP packets are not transmitted in the order of the JPEG-2000 code stream by using interleaving, reassembling of the JPEG-2000 code stream can be easily performed by referring to the value of the fragment offset field.

Next, a method of dividing the JPEG-2000 code stream into RTP packets will be described. Basically, the JPEG-2000 code stream is divided into a plurality of code units. A complete code unit (i.e., entire code unit) and an incomplete code unit (i.e., part of the code unit) are not included in a single RTP packet.

As described above, when the RTP packet is formed by hierarchical data of the JPEG-2000 code stream, hierarchical data having different importance are not contained in a single RTP packet. A main header or a tile-part header is used as a single code unit. Several packetization methods can be used in accordance with the definition of code units.

In one packetization method, a main header, a tile-part header, and encoding data (JP2 data) are used as a single code unit. A typical packetizing pattern in this case is show in FIG. 3. That is, an RTP packet including the main header as a complete data unit and an RTP packet including the tile-part header as a complete data unit are generated, with the RTP packets being separated. Further, a plurality of RTP packets including encoding data as incomplete data are generated.

Figure 3:
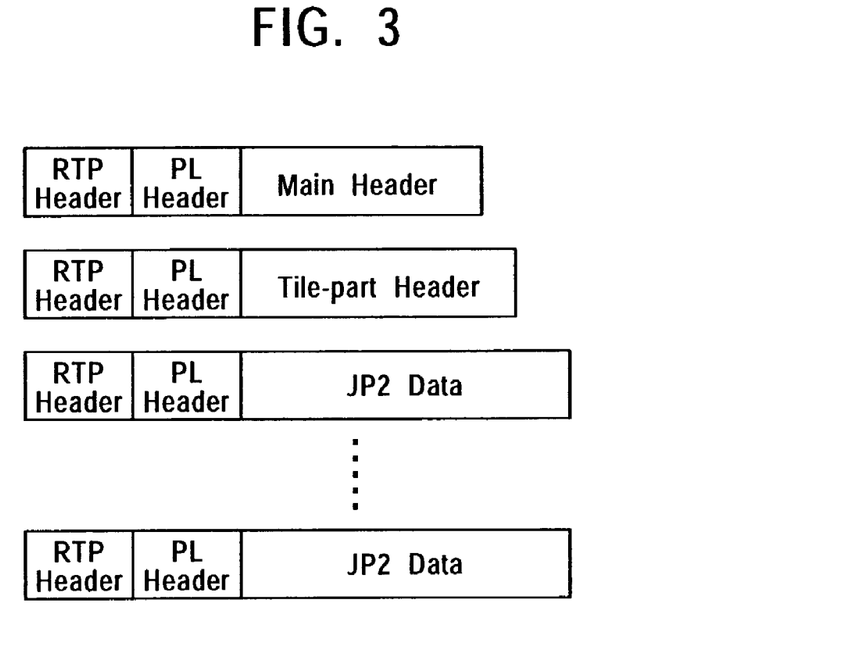
FIG. 3 shows a method of packetization.

As shown in FIG. 3, an RTP header is placed at the start of each of the RTP packets. Also, an RTP payload header (PL header) for JPEG 2000 is placed next to the RTP header. The RTP payload header for JPEG 2000 has the configuration shown in FIG. 1. JP2 data is JPEG-2000 code data.

Figure 4:
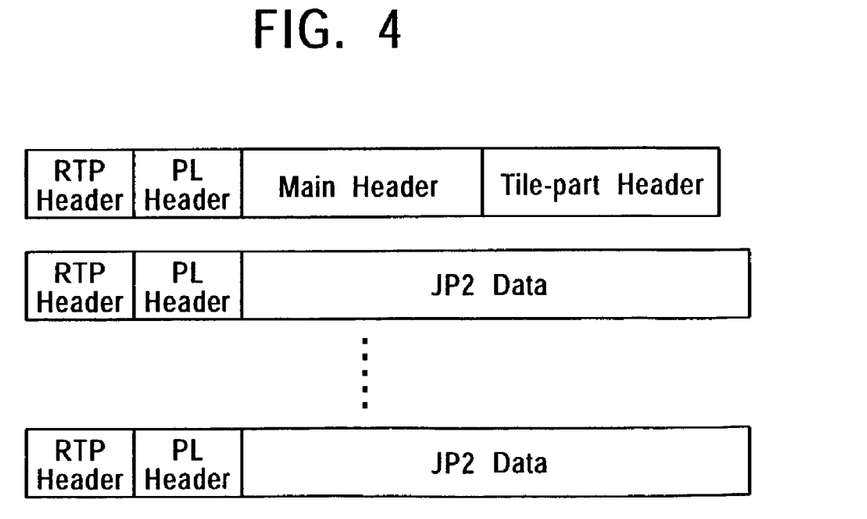
FIG. 4 shows another method of packetization.

If the length of the main header and the length of the tile-part header are small, the main header and the tile-part header may be combined into one RTP packet, as shown in FIG. 4. Further, if the length of the encoding data is also small, the main header, the tile-part header, and the encoding data may be included in one RTP packet.

When the encoding data is used as one code unit, the encoding data cannot be clearly divided, and thus an RTP packet cannot be configured for each hierarchical data. However, in this case, a process of dividing into RTP packets can be easily performed.

Another packetization method is identical to the method described above, in that each of the main header and the tile-part header is regarded as one code unit. However, this method has an advantage in that a more flexible packetization can be realized by using the encoding data in units of JP2 packet. The JP2 packet is an element unit of a JPEG-2000 image and the decode processing is performed in units of JP2 packets. Therefore, by using the JP2 packet as a code unit, a hierarchical distribution can be achieved. In this case, importance according to hierarchical information is set in the RTP packet header, and thus each RTP packet must be configured so that hierarchies having different importance do not exist in one RTP packet.

Although measures against loss of a main header will be described in detail later, the basic concept of the measures against the loss is based on the estimation: the encoding parameter is less likely to change in each image in a video stream using a JPEG-2000 format. If the encoding parameter does not change, when a main header is lost, received data can be decoded by compensating with a main header which has appropriately been received. By further developing this concept, a method in which a main header is added to a packet only when the encoding parameter changes can be adopted. In this case, the method can be realized by transmitting no RTP packet including a main header in the case of the packetization methods described above.

When a transmitted main header is lost, if the encoding parameter changes, error tolerance can be increased by adding main headers to N image frames subsequent to the changed image frame so as to transmit. Accordingly, burst errors as well as random errors can be handled. The value of N may be assigned in a fixed manner or may be dynamically determined based on the error rate reported by the receiver report (RR) of real time control protocol (RTCP) or on the error report which is independently expanded and defined by an application.

The encoding parameter is written on the main header. In addition, a representative comment for image (additional information and meta-information) is written on the main header. According to the JPEG-2000 standard, the comment can be freely used by the user. The comment is used in the following way: information such as the exact date when an image is captured; information of a capturing camera (for example, a serial number); and a location (latitude, longitude, and altitude) is input. When the information is input to the comment unit of the main header, the contents of the information are different from image frame to image frame, even if the compression parameter is not changed.

If the main header is transmitted only when the encoding parameter is changed, as in the method described above, the information is lost. Accordingly, only the changed part of the main header can be added as a compressed main header and can be transmitted.

The mh_id and mh_length shown in FIG. 1 are fields for detecting loss of a main header of a JPEG-2000 image and for its complement. In JPEG 2000, decoding cannot be performed if the information of the main header is lost. Thus, it is important to minimize the loss of a main header in order to realize a high-quality video stream.

A transmission node sets mh_id at an arbitrary value so as to transmit a first image frame. In order to transmit the subsequent image frame, the encoding parameter of the main header of the subsequent image frame is compared with the encoding parameter of the main header of the previous image frame, and if the encoding parameter is not changed, the same value is set in the mh_id field so as to transmit the packet. If the encoding parameter is changed, the value of the mh_id field is added by one for packet formation. Since the mh_id field has 4 bits, mh_id=1 is set in the subsequent packet when the value of the mh_id field is increased by 1 from 15.

Depending on the transmission node, the encoding parameters of the main headers are difficult to compare due to processing load. In that case, the transmission node sets the mh_id field at 0 for packet formation. The setting mh_id=0 indicates that detection and complement of loss of a main header is not performed (the value must not be used for the detection and complement). Accordingly, a value except 0 must be set in order to compare encoding parameters. The mh_length indicates the length of the main header and is used for easily separating the main header from the RTP packet at the receiver side.

Figure 5:
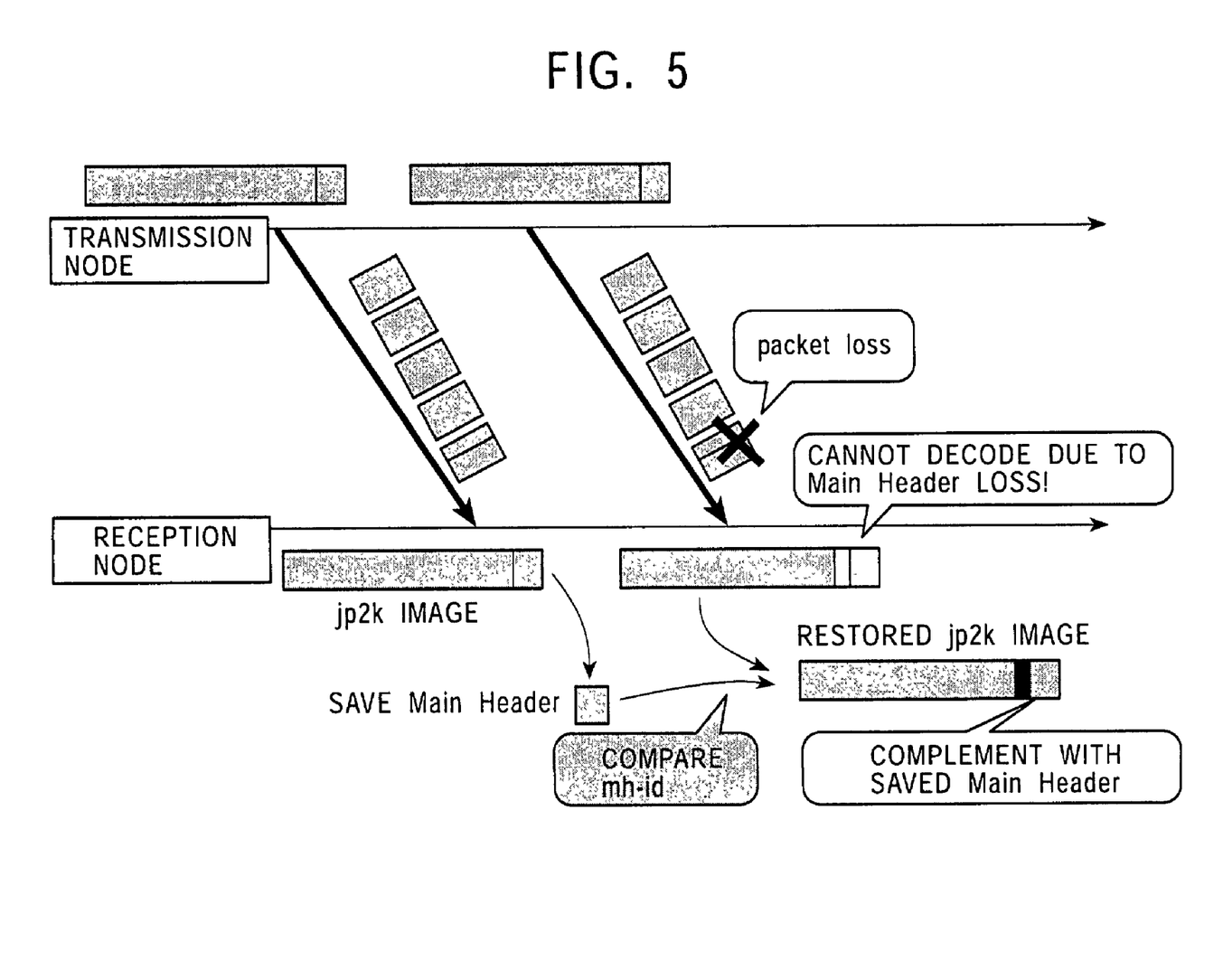
FIG. 5 illustrates a complement of a main header.

FIG. 5 shows a complement of the main header. When a reception node detects that the received frame does not include a main header, the reception node compares the saved mh_id with the mh_id of the received frame. Then, if the values of both mh_id are identical to each other, the frame is complemented with the saved main header.

Figure 6:
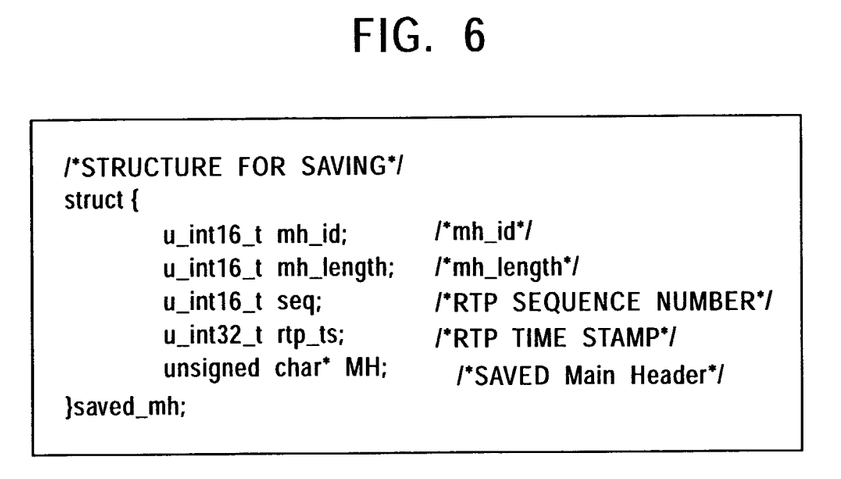
FIG. 6 shows a structure for saving the main header.
Figure 7:
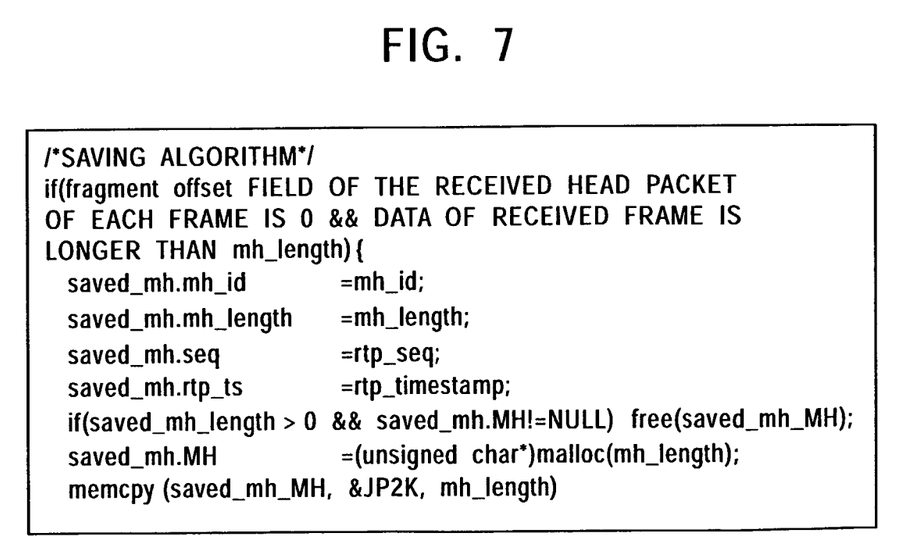
FIG. 7 shows an algorithm for saving the main header.
Figure 8:
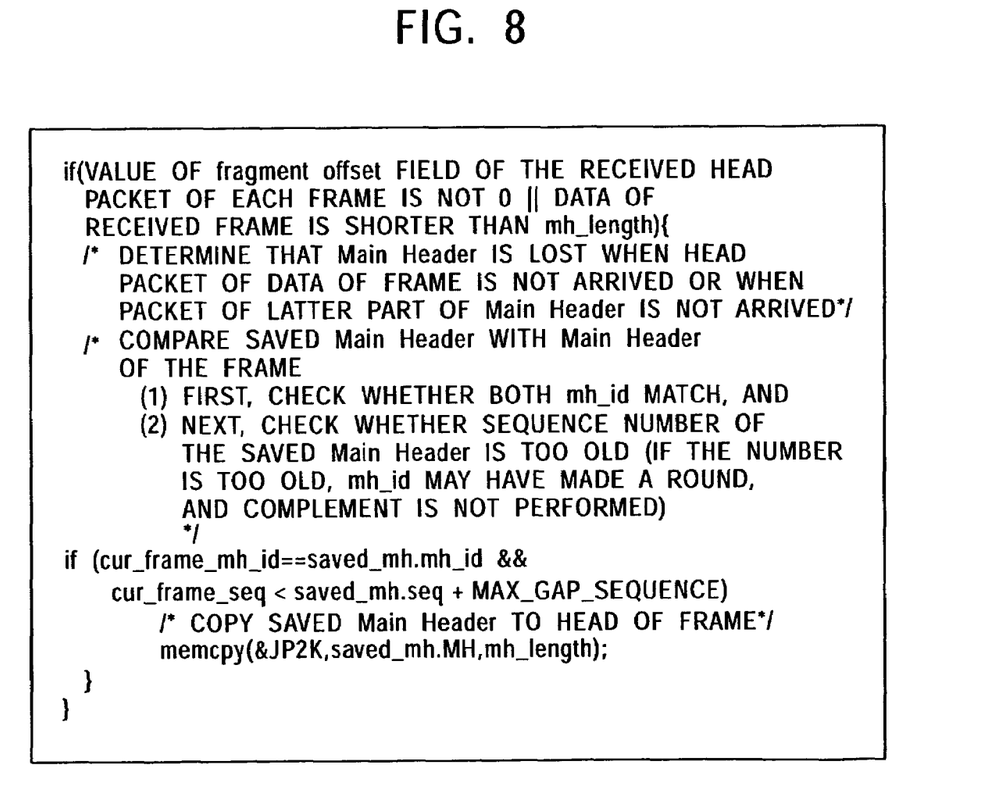
FIG. 8 shows an algorithm for detecting and complementing loss of the main header.

FIG. 6 shows the structure for saving the main header, FIG. 7 shows the algorithm for saving the main header which is adequately received, and FIG. 8 shows the algorithm for detecting and complementing a loss of a main header.

In the format shown in FIG. 1, the priority field is used for embedding the importance of the RTP packet. For example, in order to perform a hierarchical distribution according to a space resolution, a packet including a lower data has a high-priority value because lower part of the wavelet is more important.

Figure 9:
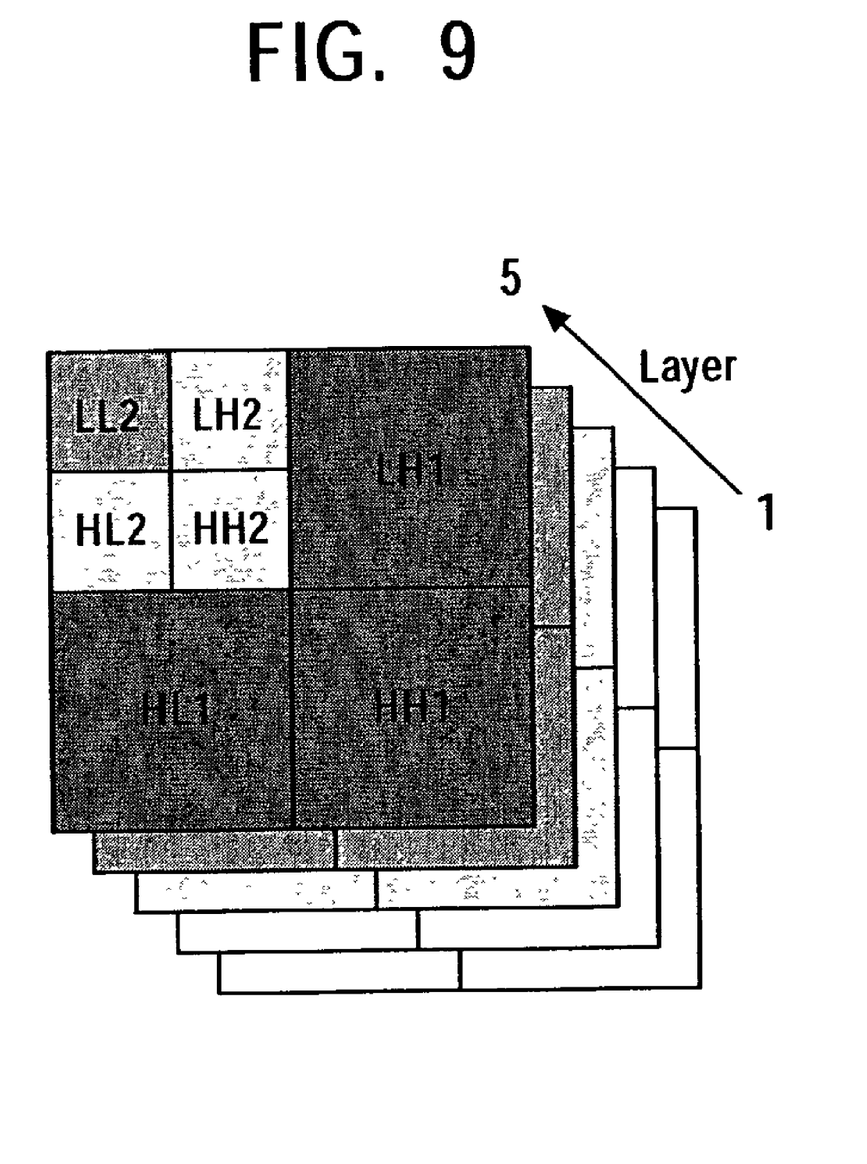
FIG. 9 shows hierarchical encoding in 3-wavelet and 5-layer form.

As shown in FIG. 9, in a JPEG-2000 image in a 3-wavelet and 5-layer form, which is obtained by hierarchical encoding, the priority mapping table shown in FIG. 2 can be defined. In the priority mapping table, when the priority changes at the beginning of the session or during communication, the transmission node and the reception node synchronize by using a signaling such as RTSP or a session initiation protocol (SIP), or by another method.

When the packets are transmitted, the transmission node transmits the packets in decreasing order of the priority. The receiver side refers to the priority field of the received packet, and when the receiver recognizes that a priority value 3 is received but a priority value 4 is not received, the receiver immediately requests the transmission node for retransmission. Otherwise, the receiver determines that the important part is lost and that decoding is meaningless (a good image quality cannot be expected), and performs a frame skip.

By defining a format for transferring JPEG 2000 with RTP, the format will be adopted for many communication applications using JPEG 2000 over the Internet and will become widespread. This format is a packet format for countering errors. Accordingly, this transmission method will effectively function in the environment where packet loss often occurs, such as the Internet. In particular, radio communication is dominant in portable terminals, which will become more common, and a packet loss occurs very often in radio communication. By loading the JPEG-2000 communication format, which is packet loss-resistant, on portable terminals, a high-definition motion picture service can be provided.

The JPEG-2000 motion picture is a motion picture format of a full intraframe and can be easily edited and processed, and thus will become widespread mainly in a broadcast system. In that case, the JPEG-2000 motion picture is expected to be used for broadcasting, and thus a JPEG-2000 RTP format will be widely used in a broadcast system.

In the present invention, data can be transmitted in both cases where the encoding parameter is changed and not changed. Also, the following methods can be adopted in order to decide whether or not to transmit the main header.

(1) Set "transmit only when the parameter changes", "only changed part is transmitted as a compressed main header", or "transmit even if the parameter does not change" at the startup of the transmission node.

(2) Depending on the state of packet loss of in a network (the state can be recognized by referring to the RR (receiver report: reception report message) of the RTCP for reporting the reception state from the reception node to the transmission node), if packet loss surpasses threshold 1, "transmit only when the parameter changes" is set, and if the packet loss further increases and the threshold surpasses 2, "only changed part is transmitted as a compressed main header" is dynamically set.

In this case, the receiver side must determine whether or not a main header is included in the received RTP packet if the main header is transmitted in any way. Thus, the following algorithm can be adopted.

Also, in this case, the following are set as premises: the main header is placed at the head of each JPEG-2000 frame; it can be detected that the frame of which RTP packet is changed among the existing RTP frames when a JPEG-2000 motion picture is divided into RTP packets so as to be transmitted; and the fragment offset shown in FIG. 1 indicates the offset bytes from the start of the JPEG-2000 image frame.

1. In the fragment offset of the head RTP packet of an image frame,
    (1-1) If the fragment offset begins from 0, the main header is transmitted.
    (1-2) If the fragment offset does not begin from 0, the main header is not transmitted.
    When the fragment offset is compared with mh_length,
    (1-2-1) If fragment offset=mh_length, the entire main header is omitted (corresponds to the above-described method in which the main header is added to a packet only when the encoding parameter changes can be adopted).
    (1-2-2) If fragment offset<mh_length, part of the main header is transmitted (corresponds to above-described packetization method using compression main header). Only the transmitted part of the saved main header is replaced so as to be used for decoding.

In JPEG 2000, images having different resolution can be easily taken from one large image. That is, in the compression format of JPEG 2000, hierarchical encoding is performed according to the standard and each hierarchy is unitized (JP2 packet). In order to create a low-resolution image, only JP2 packets of low-resolution may be extracted. In other image compression methods, a hierarchical encoding is not performed, and thus reencode must be performed, which causes transmission overhead.

By using this function, a low-resolution image can be extracted and transmitted to a narrow-band network (low-speed network). The amount of data decreases by decreasing resolution, but the size of a main header does not change. Accordingly, the proportion of a main header with respect to the entire data increases as the resolution becomes lower. In such a case, a data transmission efficiency can be increased by transmitting no main header so as to decrease the band of use in a network. Also, by decreasing the amount of data of the main header, an error-correction code can be added, or a low-band part of an image (almost the same size as the main header in a case of SD size) can be redundantly transmitted so as to increase a packet loss-tolerance.

Figure 10:
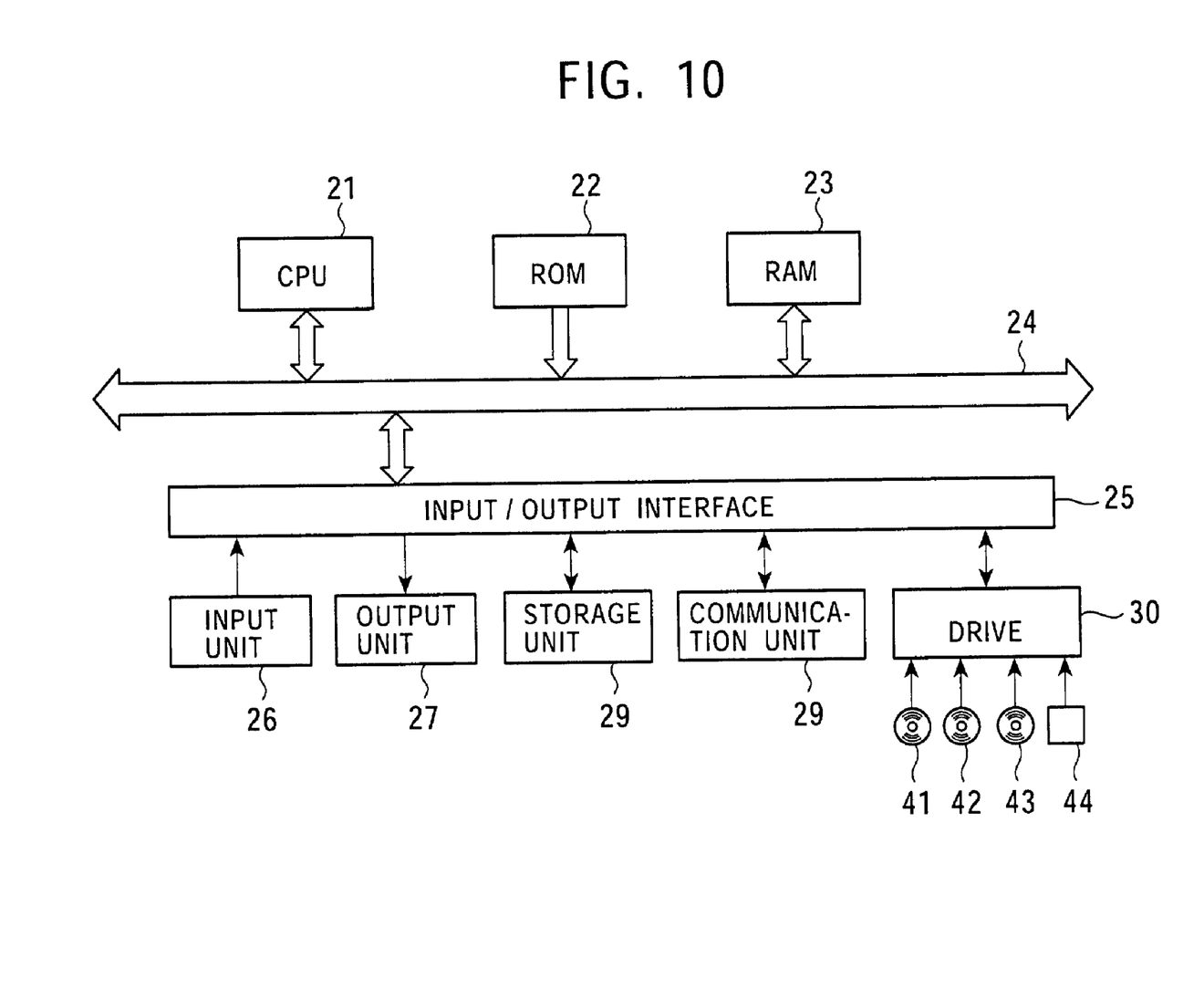
FIG. 10 is a block diagram showing an example of the configuration of a personal computer.

The series of processes described above are performed by a communication control apparatus including a personal computer as shown in FIG. 10. In FIG. 10, a central processing unit (CPU) 21 performs various processes in accordance with a program stored in a read only memory (ROM) 22 or a program loaded from a storage unit 28 to a random access memory (RAM) 23. The RAM 23 stores data required when the CPU 21 performs the various processes. The CPU 21, the ROM 22, and the RAM 23 are mutually connected via a bus 24. An input/output interface 25 is also connected to the bus 24.

An input unit 26 including a keyboard and a mouse, an output unit 27 including a display having a cathode ray tube (CRT) or a liquid crystal display (LCD) and a speaker, the storage unit 28 including a hard disk, and a communication unit 29 including a modem and a terminal adapter are connected to the input/output interface 25. The communication unit 29 performs communication processing via a network including the Internet.

Further, a drive 30 is connected to the input/output interface 25 as required. A magnetic disk 41, an optical disk 42, a magnetooptical disk 43, or a semiconductor memory 44 is loaded in the drive 30 as required. A computer program read from the recording medium is installed on the storage unit 28 as required.

The above-described series of processes may be conducted by hardware or by software. When the series of processes are conducted by software, a program forming the software is installed from a network or a recording medium to a computer incorporated into a dedicated hardware or a multi-purpose personal computer in which various functions can be performed by installing various programs.

The recording medium includes package media containing a program, such as the magnetic disk 41 (including a floppy disk), the optical disk 42 (including a compact disk read-only memory (CD-ROM) and a digital versatile disk (DVD)), the magnetooptical disk 43 (including a mini disk (MD)), and the semiconductor memory 44, which are separated from the main body of the apparatus and which are distributed for providing the program to the user, as shown in FIG. 10. Also, the recording medium includes the ROM 22 in which a program is recorded and a hard disk included in the storage unit 28, which are provided to the user such that they are incorporated into the main body of the apparatus in advance.

In the specification, the steps forming a program recorded in the recording medium may be performed in time-series in accordance with the described order. Alternatively, the steps may be performed in parallel or independently. Also, in the specification, the system means the overall apparatus including a plurality of devices. As described above, according to the transmission format, the communication control apparatus and method, the recording medium, and the program, data of JPEG-2000 format can be transmitted through the Internet.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for transmitting to a receiver packets through a network, the transmission method comprising:
    transmitting a plurality of packets to a receiver wherein a priority field indicates the importance of data included in the packets and the packets are transmitted in decreasing order of priority;
    dynamically forming a table indicating a correspondence of the importance of the data and the hierarchical information associated with the data; and
    transmitting the table to the receiver in a communication channel separate from the packets,
    wherein the packets are based on realtime transport protocol (RTP), the data is JPEG-2000 data, and the priority field is included in a payload header placed after an RTP header of the RTP packets,
    wherein the packets include a field for indicating an offset from the start of the JPEG-2000 image frame when the JPEG-2000 data is divided into a plurality of packets,
    wherein the JPEG-2000 data is divided in consideration of packet loss, wherein the division of the JPEG-2000 data in consideration of packet loss means that the JPEG-2000 data is divided into significant data units so as to configure the RTP packets with only complete data units, or the RTP packets are configured only with incomplete data units, wherein the significant data unit is the main header, tile-part header, entire data, or individual JP2 packet of JPEG-2000 standard.

2. The transmission method according to claim 1, wherein the packets include information required for complementing a main header of the JPEG-2000 data.

3. The transmission method according to claim 2, wherein the information required for complementing the main header is a main header identifier.

4. The transmission method according to claim 2, wherein the information required for complementing the main header is the length of the main header.

5. The transmission method according to claim 2, wherein the packets include a packet type field indicating which data unit is packetized when packet formation is performed in data units.

6. An apparatus for transmitting packets through a network to a receiver, the transmission apparatus comprising:

a transmitter configured to transmit a plurality of packets to the receiver wherein a priority field indicates the importance of data included in the packets and configured to dynamically form a table indicating a correspondence of the importance of the data and the hierarchical information associated with the data; and transmit the table to the receiver in a communication channel separate from the packets, wherein the packets are transmitted in decreasing order of priority, wherein the packets are based on realtime transport protocol (RTP), the data is JPEG-2000 data, and the priority field is included in a payload header placed after an RTP header of the RTP packets, wherein the packets include a field for indicating an offset from the start of the JPEG-2000 image frame when the JPEG-2000 data is divided into a plurality of packets, wherein the JPEG-2000 data is divided in consideration of packet loss, wherein the division of the JPEG-2000 data in consideration of packet loss means that the JPEG-2000 data is divided into significant data units so as to configure the RTP packets with only complete data units, or the RTP packets are configured only with incomplete data units, wherein the significant data unit is the main header, tile-part header, entire data, or individual JP2 packet of JPEG-2000 standard.

7. A communication system comprising:
a transmitter and a receiver, wherein the transmitter includes:

a dividing section for dividing a progressive coding data into a plurality of data units;

an importance determination section for deciding an importance of each of the plurality of data units;

a table forming section for dynamically forming a table indicating a correspondence of the importance of the data and hierarchical information associated with the data;

an RTP packet generation section for generating a RTP packet by adding an RTP header to the data unit and an RTP payload header wherein the RTP payload header includes the importance information indicating the importance of the data unit; and a transmission section for transmitting a plurality of RTP packets and for transmitting the table in a communication channel separate from the RTP packets, wherein the RTP packets are transmitted in decreasing order of importance;

and wherein the receiver includes:

a reception section for receiving the RTP packets sent by the transmitter and for receiving a table transmitted in a communication channel separate from the RTP packets;

a retransmission request section for requesting a retransmission of a RTP packet based on the importance information which is included in the RTP packets, wherein the packets are based on realtime transport protocol (RTP), the data is JPEG-2000 data, and the priority field is included in a payload header placed after an RTP header of the RTP packets, wherein the packets include a field for indicating an offset from the start of the JPEG-2000 image frame when the JPEG-2000 data is divided into a plurality of packets, wherein the JPEG-2000 data is divided in consideration of packet loss, wherein the division of the JPEG-2000 data in consideration of packet loss means that the JPEG-2000 data is divided into significant data units so as to configure the RTP packets with only complete data units, or the RTP packets are configured only with incomplete data units, wherein the significant data unit is the main header, tile-part header, entire data, or individual JP2 packet of JPEG-2000 standard.

8. A transmitter comprising:
a dividing section for dividing a progressive coding data into a plurality of data units;

an importance determination section for deciding an importance of each of the plurality of data units;

a table forming section for dynamically forming a table indicating a correspondence of the importance of the data and hierarchical information associated with the data and hierarchical information associated with the data;

an realtime transport protocol (RTP), packet generation section for generating a RTP packet by adding an RTP header to the data unit and an RTP payload header wherein the RTP payload header includes the importance information indicating the importance of the data unit; and a transmission section for transmitting a plurality of RTP packets generated by the RTP generating section and for transmitting the table in a communication channel separate from the RTP packets to a receiver, wherein the RTP packets are transmitted in decreasing order of importance, wherein the packets are based on RTP, the data is JPEG-2000 data, and the priority field is included in a payload header placed after an RTP header of the RTP packets, wherein the packets include a field for indicating an offset from the start of the JPEG-2000 image frame when the JPEG-2000 data is divided into a plurality of packets, wherein the JPEG-2000 data is divided in consideration of packet loss, wherein the division of the JPEG-2000 data in consideration of packet loss means that the JPEG-2000 data is divided into significant data units so as to configure the RTP packets with only complete data units, or the RTP packets are configured only with incomplete data units, wherein the significant data unit is the main header, tile-part header, entire data, or individual JP2 packet of JPEG-2000 standard.

9. A receiver comprising:

a reception section for receiving a plurality of realtime transport protocol (RTP) packets sent by a transmitter and for receiving a table transmitted in a communication channel separate from the RTP packets, wherein the RTP packets are received in decreasing order of importance;

a retransmission request section for requesting a retransmission of a RTP packet based on the importance information which is included in the RTP packets, wherein the packets are based on RTP, the data is JPEG-2000 data, and the priority field is included in a payload header placed after an RTP header of the RTP packets, wherein the packets include a field for indicating an offset from the start of the JPEG-2000 image frame when the JPEG-2000 data is divided into a plurality of packets, wherein the JPEG-2000 data is divided in consideration of packet loss, wherein the division of the JPEG-2000 data in consideration of packet loss means that the JPEG-2000 data is divided into significant data units so as to configure the RTP packets with only complete data units, or the RTP packets are configured only with incomplete data units, wherein the significant data unit is the main header, tile-part header, entire data, or individual JP2 packet of JPEG-2000 standard.

* * * * *